US009241198B2

(12) United States Patent
Khare

(10) Patent No.: US 9,241,198 B2
(45) Date of Patent: Jan. 19, 2016

(54) METHOD AND SYSTEM FOR AUTOMATICALLY SCHEDULING AND INSERTING TELEVISION COMMERCIAL AND REAL-TIME UPDATING OF ELECTRONIC PROGRAM GUIDE

(71) Applicant: SUREWAVES MEDIATECH PRIVATE LIMITED, Bangalore (IN)

(72) Inventor: Rajendra Kumar Khare, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 0 days.

(21) Appl. No.: 14/619,928

(22) Filed: Feb. 11, 2015

(65) Prior Publication Data
US 2015/0237411 A1 Aug. 20, 2015

(30) Foreign Application Priority Data
Feb. 14, 2014 (IN) .............................. 690/CHE/2014

(51) Int. Cl.
G06F 13/00 (2006.01)
H04N 21/81 (2011.01)
H04N 21/482 (2011.01)
H04N 21/478 (2011.01)

(52) U.S. Cl.
CPC ........... *H04N 21/812* (2013.01); *H04N 21/478* (2013.01); *H04N 21/482* (2013.01)

(58) Field of Classification Search
CPC .. H04N 21/812; H04N 21/478; H04N 21/482
USPC ......................................................... 725/42
See application file for complete search history.

(56) References Cited

U.S. PATENT DOCUMENTS

| 7,797,441 | B1 * | 9/2010 | Barnes | G06F 15/16 709/217 |
| 8,024,766 | B2 * | 9/2011 | Addington | H04N 7/17318 725/115 |
| 8,214,518 | B1 * | 7/2012 | Bertz | H04L 65/605 709/219 |
| 8,572,639 | B2 * | 10/2013 | Ficco | H04H 20/106 725/14 |
| 8,762,504 | B2 * | 6/2014 | Khare | H04L 63/0492 709/222 |
| 8,789,090 | B1 * | 7/2014 | Brueck | H04L 65/601 725/32 |
| 2001/0028662 | A1 * | 10/2001 | Hunt | G06Q 30/02 370/487 |
| 2002/0162106 | A1 * | 10/2002 | Pickover | G06Q 30/02 725/42 |
| 2003/0009452 | A1 * | 1/2003 | O'Rourke | G06F 17/30053 |
| 2003/0177490 | A1 * | 9/2003 | Hoshino | G06Q 30/02 725/34 |
| 2003/0217170 | A1 * | 11/2003 | Nelson | G06Q 30/02 709/231 |

(Continued)

Primary Examiner — Nasser Goodarzi
Assistant Examiner — Michael B Pierorazio
(74) Attorney, Agent, or Firm — Barry Choobin; Patent 360 LLC

(57) ABSTRACT

A method and system for automatically scheduling television commercials within the broadcasting content have been disclosed. A program scheduling module schedules television programs (broadcasting content) with respect to specific time-slots for advertisement insertion. An advertisement scheduling module schedules television commercials to be inserted into the broadcast content. The advertisement module determines time slots in the television programs for inserting television commercials, and dynamically inserts television commercials at specific time slots within the television programs prior to broadcasting.

12 Claims, 2 Drawing Sheets

(56) References Cited

U.S. PATENT DOCUMENTS

| | | | |
|---|---|---|---|
| 2004/0019497 A1* | 1/2004 | Volk | G06F 17/30017 705/1.1 |
| 2004/0025185 A1* | 2/2004 | Goci | G07F 5/18 725/92 |
| 2006/0080167 A1* | 4/2006 | Chen | G06Q 30/02 705/14.68 |
| 2006/0212442 A1* | 9/2006 | Conrad | G06F 17/30026 |
| 2006/0212444 A1* | 9/2006 | Handman | G06F 17/30017 |
| 2007/0055985 A1* | 3/2007 | Schiller | G06F 13/4027 725/34 |
| 2007/0204310 A1* | 8/2007 | Hua | H04N 7/17318 725/88 |
| 2008/0189735 A1* | 8/2008 | Barton | G11B 27/036 725/32 |
| 2008/0319844 A1* | 12/2008 | Hua | G06Q 30/02 705/14.73 |
| 2009/0019374 A1* | 1/2009 | Logan | H04M 3/4872 715/753 |
| 2009/0079871 A1* | 3/2009 | Hua | G11B 27/036 348/584 |
| 2009/0171787 A1* | 7/2009 | Mei | G06Q 30/0273 705/14.69 |
| 2009/0259552 A1* | 10/2009 | Chenard | G06Q 30/02 705/14.72 |
| 2010/0082635 A1* | 4/2010 | Elsner | H04N 7/17318 707/741 |
| 2010/0083305 A1* | 4/2010 | Acharya | H04N 21/44004 725/34 |
| 2010/0146542 A1* | 6/2010 | Weihs | H04N 7/17318 725/34 |
| 2010/0169459 A1* | 7/2010 | Biderman | H04N 7/17318 709/219 |
| 2010/0228591 A1* | 9/2010 | Therani | G06Q 30/00 705/14.54 |
| 2010/0228592 A1* | 9/2010 | Anderson | G06Q 30/00 705/14.54 |
| 2010/0242079 A1* | 9/2010 | Riedl | H04N 7/17318 725/115 |
| 2010/0272419 A1* | 10/2010 | Wang | G11B 27/105 386/248 |
| 2011/0016479 A1* | 1/2011 | Tidwell | G06Q 30/02 725/9 |
| 2011/0022589 A1* | 1/2011 | Bauer | G06F 17/30855 707/723 |
| 2011/0072105 A1* | 3/2011 | Biderman | H04N 7/17318 709/217 |
| 2011/0145858 A1* | 6/2011 | Philpott | H04N 21/458 725/32 |
| 2011/0191439 A1* | 8/2011 | Dazzi | G06F 15/16 709/217 |
| 2011/0191445 A1* | 8/2011 | Dazzi | G06F 15/16 709/219 |
| 2011/0191446 A1* | 8/2011 | Dazzi | G06F 15/16 709/219 |
| 2011/0191447 A1* | 8/2011 | Dazzi | G06F 15/16 709/219 |
| 2011/0191801 A1* | 8/2011 | Vytheeswaran | H04N 7/10 725/34 |
| 2011/0246622 A1* | 10/2011 | Pantos | H04L 65/1083 709/219 |
| 2011/0246623 A1* | 10/2011 | Pantos | H04L 65/1083 709/219 |
| 2011/0246661 A1* | 10/2011 | Manzari | G06Q 30/02 709/231 |
| 2011/0264530 A1* | 10/2011 | Santangelo | G06Q 30/02 705/14.64 |
| 2011/0320300 A1* | 12/2011 | Broms | G06Q 30/02 705/26.2 |
| 2012/0124618 A1* | 5/2012 | Ruiz-Velasco | G06Q 30/0241 725/32 |

* cited by examiner

METHOD AND SYSTEM FOR AUTOMATICALLY SCHEDULING AND INSERTING TELEVISION COMMERCIAL AND REAL-TIME UPDATING OF ELECTRONIC PROGRAM GUIDE

CROSS-REFERENCE TO RELATED APPLICATIONS

The embodiments herein claims the priority of the Indian Provisional Patent Application with Serial Number 690/CHE/2014 filed on Feb. 14, 2014 with the title, "Method and System for Automatically Scheduling and Inserting Television Commercial and Real-Time Updating of Electronic Program Guide" and the contents of which is incorporated in entirety as reference herein.

BACKGROUND

1. Technical Field

The embodiments herein generally relate to field of advertising and particularly relate to the field of advertising on television. The embodiments herein more particularly relate to a method and system for automatically scheduling and inserting television commercials and real-time updating of electronic program guide.

2. Description of the Related Art

Providing advertisements to consumers has long been the subject of much research, especially in how to best provide appropriate advertisements to the relevant consumer market.

Various methodologies are proposed for providing advertisements to consumers. With the ever increasing number of consumer choices for television viewing, it is important for advertisers, content producers, and service providers such as cable television and satellite television companies to be able to accurately deliver advertisements to consumers. Traditional methods of delivering advertisements to consumers are less efficient in inserting advertisements between the programs. Traditional methods use markers for identifying time slots in the actual program for inserting advertisement. If markers are miss placed for some reason, then the advertisement insertion may also get misplaced. Traditional methods generally use manual advertisements insertion techniques, which are error prone, less efficient and requires expensive set-ups.

In view of the foregoing, there is a need for a method and system for automatically scheduling and inserting television commercials without markers. There is also a need for an automated process for real time updating of electronic program guide. Further there is a need to centrally control a time slot for airing preset program on all the plurality of television or radio channels.

The above mentioned shortcomings, disadvantages and problems are addressed herein and which will be understood by reading and studying the following specification.

OBJECTS OF THE EMBODIMENTS HEREIN

The primary object of the embodiments herein is to provide a method and system for automatically scheduling and inserting television commercials within the broadcasting content of multiple channels under a centralized control.

Another object of the embodiments herein is to provide a method and system for real time updating of electronic program guide (EPG) of multiple channels under a centralized control.

Yet another object of the embodiments herein is to provide a method and system for measuring and verifying the advertisements inserted in the broadcasting content for accountability.

Yet another object of the embodiments herein is to provide a method and system for centrally controlling a preset time slot on all the television or radio channels for airing preset program thereby preventing an operator to air or telecast radio or television programs in the centrally controlled preset time slot.

Yet another object of the embodiments herein is to provide a method and system for indicating a program name accurately dynamically in real time even when a program is changed or altered at last minute before telecast/broadcast in television/radio channels.

Yet another object of the embodiments herein is to provide a method and system to transmit a program name back to media station or media grid for effecting changes, when a program name is changed.

Yet another object of the embodiments herein is to provide a method and system for collecting program name of broadcast or telecast programs for each channel from a channel administrator for displaying program name of broadcast or telecast programs on television or radio channels accurately.

Yet another object of the embodiments herein is to provide a method and system to adjust commercial slots with respect to scheduled advertisements by matching advertisement telecast/broadcast time with respect to assigned commercial time slots and filling remaining time in the commercial time slots after broadcasting or telecasting all the scheduled advertisements with promotional advertisements/programs and fillers in television or radio channels.

These and other objects and advantages of the embodiments herein will become readily apparent from the following detailed description taken in conjunction with the accompanying drawings.

SUMMARY

The various embodiments herein provide a method and system for dynamically reconfiguring the scheduled advertisement slots. The system comprises a program scheduling module for scheduling one or more television programs or broadcasting content along with specific time-slots for advertisement insertion, an advertisement scheduling module for scheduling one or more television or radio commercials to be inserted at respective time-slots across plurality of television or radio programs and across plurality of television or radio channels, a media grid hosted on cloud, a centrally controlled play-out system and a RF modulator. The centrally controlled play-out station comprises a Fix Point Chart (FPC) aggregation module, and an advertisement insertion module. The advertisement insertion module is configured for determining, one or more time slots in the television programs for inserting television/radio commercials, inserting television/radio commercials at specific time slots within one or more television/radio programs dynamically and airing/playing inserted television/radio commercials at specific time slots within one or more television/radio programs the system further comprises a RF modulator for modulating the output of the centrally controlled play-out system/station on a default frequency which is then broadcasted to all the households through a RF or optical cables via set-top-box and/or an internet for interconnecting various system components and a television for playing broadcasted multimedia content. The system further comprises a controller arranged in the centrally controlled play-out station to control the FPC aggregation module and advertisement insertion module and electronic program guide.

According to an embodiment herein, the set-top-box is a cable television set-top-box or a DTH set-top-box.

According to an embodiment herein, the program scheduling module/FPC aggregation module receives plurality of television program information in the form of Electronic Program Guide (EPG) from plurality of channel broadcasters at regular intervals. The program scheduling module transmits the plurality of television program information received in the form of Electronic Program Guide (EPG) to the media grid. The media grid updates the Electronic Program Guide (EPG), each time when a new Electronic Program Guide (EPG) is received from the program scheduling module.

According to an embodiment herein, the advertisement scheduling module comprises one or more scheduling teams fir scheduling the advertisements, trailers, promotions, and the like to be aired at respective time-slots within one or more television programs at the set-top-box. The time-slots for each of the advertisements, trailers, promotions, and the like are pre-programmed in the advertisement scheduling module.

According to an embodiment herein, the media grid is hosted on a cloud. The media grid comprises scheduling information of the advertisements, trailers, promotions, and the like and the Electronic Program Guide (EPG) of plurality of channel broadcasters.

According to an embodiment herein, the centrally controlled play-out station/system enables transmission of radio or television channels from the broadcaster into broadcast networks. These networks consist of terrestrial/satellite transmitters or cable networks for transmitting radio/television signals for analogue/digital radio/television, cable networks or satellites.

According to an embodiment herein, the set-top-box receives modulated output of the centrally controlled playout system and transparently transmits radio or television signals from the broadcaster to the radio or television.

According to an embodiment herein, the centrally controlled play-out system automatically inserts television commercials at specific time slots within one or more television programs. The central playout system dynamically adjusts the pre-scheduled one or more time slots in the television programs based on the received television commercials.

According to an embodiment herein, the centrally controlled play-out system dynamically shrinks a specific time slot in the television programs to adjust the television commercials to be inserted in that particular time slot, when the play time of the television commercial is less than the actual scheduled time slot in the television programs. For example, if a time slot in the television program for inserting television commercials is predefined for '5 minutes', and if the play time of the specific television commercial is '3 minutes' then the centrally controlled playout system dynamically shrinks the specific time slot in the television program to '3 minutes' and then the rest of the programs are dynamically re-adjusted.

According to an embodiment herein, the centrally controlled play-out system dynamically fills the promotional advertisements or filler advertisements at a specific time slot in the television programs to adjust the television commercials to be inserted in that particular time slot, when the play time of the television commercial is less than the actual scheduled time slot in the television programs. For example, if a time slot in the television program for inserting television commercials is predefined for '5 minutes', and if the play time of the specific television commercial is '3 minutes' then the central playout system dynamically inserts '2 minutes' of promotional advertisements or filler advertisements at the remaining 2 minutes in the '5 minutes' time slot in the television program.

According to an embodiment herein, the centrally controlled play-out system reports the proof of television commercial played within the said time-slot for accountability. The centrally controlled play-out system creates a proof of play archive along with a video achieve comprising an actual television commercial played at the scheduled time along with the date and time stamp.

According to an embodiment herein, the system further comprises a web based monitoring application which then accesses the reports and video archives from the centrally controlled play-out system and displays them to advertisers who are authorized to see these reports through a unique password or an access mechanism provided to them. This provides a proof of play mechanism for accountability purposes.

According to an embodiment herein, the multiplexer/RF modulator receives radio or television channels from the centrally controlled play-out system, combines the received radio or television channels with a plurality of radio or television channels and inserts into the common cable. The plurality of radio or television channels are transmitted though a single cable with different frequencies to the set-top-box.

According to an embodiment herein, the modulated radio or television channels received at the set-top-box are de-modulated either by the set top-box or by the television.

According to an embodiment herein, a method and system is provided for automatically scheduling, and inserting television commercials within the broadcasting content of multiple channels under a centralized control.

According to one embodiment herein, a method and system is provided for real time updating of electronic program guide (EPG) of multiple channels under a centralized control.

According to one embodiment herein, a method and system is provided for measuring and verifying the advertisements inserted in the broadcasting content for accountability.

According to one embodiment herein, a method and system is provided for centrally controlling a preset time slot on all the television or radio channels for airing/telecasting/broadcasting preset program thereby preventing an operator to air or telecast radio or television programs in the centrally controlled preset time slot.

According to one embodiment herein, a method and system is provided for indicating a program name accurately dynamically in real time even when a program is changed or altered at last minute before telecast/broadcast in television/radio channels.

According to one embodiment herein, a method and system is provided to transmit a program name back to media station or media grid for effecting changes, when a program name is changed.

According to one embodiment herein, a method and system is provided for collecting program name of broadcast or telecast programs for each channel from a channel administrator for displaying program name of broadcast or telecast programs on television or radio channels accurately.

According to one embodiment herein, a method and system is provided to adjust commercial slots with respect to scheduled advertisements by matching advertisement telecast/broadcast time with respect to assigned commercial time slots and filling remaining time in the commercial time slots after broadcasting or telecasting all the scheduled advertisements with promotional advertisements/programs and fillers in television or radio channels.

According to one embodiment herein, the preset scheduled advertisement time slot is matched with the scheduled advertisement time when the length of time of the scheduled advertisement is more than the preset commercial time slot.

According to one embodiment herein, the system and method is provided with FPC aggregation module to provide an accurate description of a name of the programs to be aired/telecast in real time, even the program is changed at any time before airing/telecast/broadcast. The FPC directly collects the scheduled program information along with name and time stamp from each channel operator and forwards the same to the media grid and the centrally controlled play-out station.

According to one embodiment herein, the system provides data to IPTV also.

According to one embodiment herein, the signal is viewed with not only on television monitors but also on any compatible device such as portable computers, smart phones, ipads, ipods, tablet PC, IP TV.

These and other aspects of the embodiments herein will be understood when considered in conjunction with the following description and the accompanying drawings. It should be understood, however, that the following description, while indicating the preferred embodiments and numerous specific details thereof, are given by way of illustration and not by the way of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the an from the following description of the preferred embodiment and the accompanying drawings in which.

Figure 1:
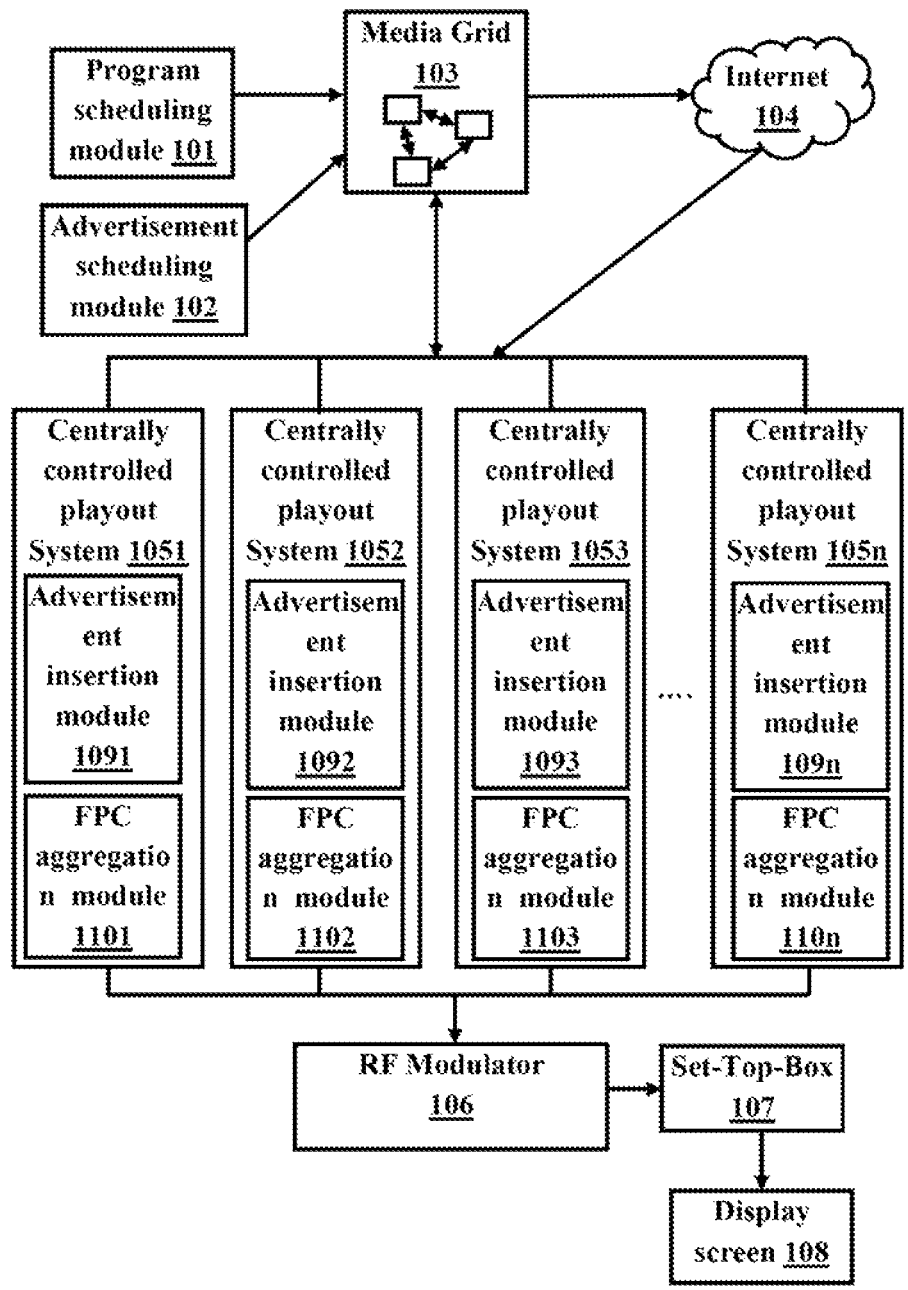
FIG. 1 illustrates a block diagram of a system for dynamically reconfiguring a plurality of scheduled advertisement slots, according to an embodiment herein.

Although the specific features of the embodiments herein are shown in some drawings and not in others, it has been done for convenience only as each feature may be combined with any or all of the other features in accordance with the embodiments herein.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide to method and system for dynamically reconfiguring the scheduled advertisement slots. The system comprises a program scheduling module for scheduling one or more television programs or broadcasting content along with specific time-slots for advertisement insertion, an advertisement scheduling module for scheduling one or more television or radio commercials to be inserted at respective time-slots across plurality of television or radio programs and across plurality of television or radio channels, a media grid hosted on cloud, a centrally controlled play-out system and a RF modulator. The centrally controlled, play-out station comprises a Fix Point Chart (FPC) aggregation module and an advertisement insertion module. The advertisement insertion module is configured for determining one or more time slots in the television programs for inserting television/radio commercials, inserting television/radio commercials at specific time slots within one or more television/radio programs dynamically and airing/playing inserted television/radio commercials at specific time slots within one or more television/radio programs. The system further comprises a RF modulator for modulating the output put of the centrally controlled play-out system/station on a default frequency which is then broadcasted to all the households through a RF or optical cables via set-top-box and/or an internet for interconnecting various system components and a television for playing broadcasted multimedia content. The system further comprises a controller arranged in the centrally controlled play-out station to control the FPC aggregation module and advertisement insertion module and electronic program guide.

According to an embodiment herein, the set-top-box is a cable television set-top-box or a DTH set-top-box.

According to an embodiment herein, the program scheduling module/FPC aggregation module receives plurality of television program information in the form of Electronic Program Guide (EPG) from plurality of channel broadcasters at regular intervals. The program scheduling module transmits the plurality of television program information received in the form of Electronic Program Guide (EPG) to the media grid. The media grid, updates the Electronic Program Guide (EPG), each time when a new Electronic Program Guide (EPG) is received from the program scheduling module.

According to an embodiment herein, the advertisement scheduling module comprises one or more scheduling teams for scheduling the advertisements, trailers, promotions, and the like to be aired at respective time-slots within one or more television programs at the set-top-box. The time-slots for each of the advertisements, trailers, promotions, and the like are pre-programmed in the advertisement scheduling module.

According to an embodiment herein, the media grid is hosted on as cloud. The media grid comprises scheduling information of the advertisements, traders, promotions, and the like and the Electronic Program Guide (EPG) of plurality of channel broadcasters.

According to an embodiment herein, the centrally controlled play-out station/system enables transmission of radio or television channels from the broadcaster into broadcast networks. These networks consist of terrestrial/satellite transmitters or cable networks for transmitting radio/television signals for analogue/digital radio/television, cable networks or satellites.

According to an embodiment herein, the set-top-box receives modulated output of the centrally controlled playout system and transparently transmits radio or television signals from the broadcaster to the radio or television.

According to an embodiment herein, the centrally controlled play-out system automatically inserts television commercials at specific time slots within one or more television programs. The central playout system dynamically adjusts the pre-scheduled one or more time slots in the television programs based on the received television commercials.

According to an embodiment herein, the centrally controlled play-out system dynamically shrinks a specific time slot in the television programs to adjust the television commercials to be inserted in that particular time slot, when the play time of the television commercial is less than the actual scheduled time slot in the television programs. For example, if a time slot in the television program for inserting television commercials is predefined for '5 minutes', and if the play time of the specific television commercial is '3 minutes' than the centrally controlled playout system dynamically shrinks the specific time slot in the television program to '3 minutes' and then the rest of the programs are dynamically re-adjusted.

According to an embodiment herein, the centrally controlled play-out system dynamically fills the promotional advertisements or filler advertisements at a specific time slot in the television programs to adjust the television commercials to be inserted in that particular tune slot, when the play time of the television commercial is less than the actual scheduled time slot in the television programs. For example, if a time slot in the television program for inserting television commercials is predefined for '5 minutes', and if the play time of the specific television commercial is '3 minutes' then the central playout system dynamically inserts '2 minutes' of promotional advertisements or filler advertisements at the remaining 2 minutes in the '5 minutes' time slot in the television program.

According to an embodiment herein, the centrally controlled play-out system reports the proof of television commercial played within the said time-slot for accountability. The centrally controlled play-out system creates a proof of play archive along with a video achieve comprising an actual television commercial played at the scheduled time along with the date and time stamp.

According to an embodiment herein, the system further comprises a web based monitoring application which then accesses the reports and video archives from the centrally controlled play-out system and displays them to advertisers who are authorized to see these reports through a unique password or an access mechanism provided to them. This provides a proof of play mechanism for accountability purposes.

According to an embodiment herein, the multiplexer/RF modulator receives radio or television channels from the centrally controlled play-out system, combines the received radio or television channels with a plurality of radio or television channels and inserts into the common cable. The plurality of radio or television channels are transmitted though a single cable with different frequencies to the set-top-box.

According to an embodiment herein, the modulated radio or television channels received at the set-top-box are demodulated either by the set-top-box or by the television.

According to an embodiment herein, a method and system is provided for automatically scheduling and inserting television commercials within the broadcasting content of multiple channels under a centralized control.

According to one embodiment herein, a method and system is provided for real time updating of electronic program guide (EPG) of multiple is channels under a centralized control.

According to one embodiment herein, a method and system is provided for measuring and verifying the advertisements inserted in the broadcasting content for accountability.

According to one embodiment herein, a method and system is provided, for centrally controlling a preset time slot on all the television or radio channels for airing/telecasting/broadcasting preset program thereby preventing an operator to air or telecast radio or television programs in the centrally controlled preset time slot.

According to one embodiment herein, a method and system is provided for indicating a program name accurately dynamically in real time even when a program is changed or altered at last minute before telecast/broadcast in television/radio channels.

According to one embodiment herein, a method and system is provided to transmit a program name back to media station or media grid for effecting changes, when a program name is changed.

According to one embodiment herein, a method and system is provided for collecting program name of broadcast or telecast programs for each channel from a channel administrator for displaying program name of broadcast or telecast programs on television or radio channels accurately.

According to one embodiment herein, a method and system is provided to adjust commercial slots with respect to scheduled advertisements by matching advertisement telecast/broadcast time with respect to assigned commercial time slots and filling remaining time in the commercial time slots after broadcasting or telecasting all the scheduled advertisements with promotional advertisements/programs and fillers in television or radio channels.

According to one embodiment herein, the preset scheduled advertisement time slot is matched with the scheduled advertisement time when the length of time of the scheduled advertisement is more than the preset commercial time slot.

According to one embodiment herein, the system and method is provided with FPC aggregation module to provide an accurate description of a name of the programs to be aired/telecast in real time even the program is changed at any time before airing/telecast/broadcast. The FPC directly collects the scheduled program information along with name and time stamp from each channel operator and forwards the same to the media grid and the centrally controlled play-out station.

According to one embodiment herein, the system provides data to IPTV also.

According to one embodiment herein, the signal is viewed with not only on television monitors but also on any compatible device such as portable computers, smart phones, ipads, ipods, tablet PC, IP TV.

FIG. 1 illustrates a block diagram of a system for dynamically reconfiguring a plurality of scheduled advertisement slots, according to an embodiment herein. The system comprises a program scheduling module 101 for scheduling one or more television programs along with specific time-slots for advertisement insertion, an advertisement scheduling module 102 for scheduling one or more television commercials to be inserted at respective time-slots across plurality of television programs, a media grid 103 hosted on cloud, a centrally controlled playout system 105l . . . 105n comprising an advertisement insertion module 109l . . . 109n for: determining one or more time slots in the television programs for inserting television commercials, inserting television commercials at specific time slots within one or more television programs dynamically and airing/playing inserted television commercials at specific time slots within one or more television programs. The system further comprises a RF modulator 106 for modulating the output of the centrally controlled playout system on a preset frequency which is then broadcasted to all the households through a RF or optical cables via set-top-box 107, an internet 104 for interconnecting various system components and a television 108 for playing broadcasted multimedia content. The system further comprises a FPC aggregation module 110l . . . 110n.

According to an embodiment herein, the set-top-box 107 is a cable television set-top-box or a DTH set-top-box or IPTV set-top-box.

According to an embodiment herein, the program scheduling module 102 receives plurality of television program information in the form of Electronic Program Guide (EPG) from plurality of channel broadcasters at regular intervals. The program scheduling module 102 transmits the plurality of television program information received in the form of Electronic Program Guide (EPG) to the media grid 103. The media grid 103 updates the Electronic Program Guide (EPG), each time when a new Electronic Program Guide (EPG) is received from the program scheduling module 102.

According to an embodiment herein, the advertisement scheduling module 102 comprises one or more scheduling teams for scheduling the advertisements, trailers, promotions, and the like to be aired at respective time-slots within one or more television programs at the set-top-box 107. The time-slots for each of the advertisements, trailers, promotions, and the like are pre-programmed in the advertisement scheduling module 102.

According to an embodiment herein, the media grid 103 is hosted on a cloud. The media grid 103 comprises scheduling information of the advertisements, trailers, promotions, and the like and the Electronic Program Guide (EPG) of plurality of channel broadcasters.

According to an embodiment herein, the centrally controlled playout system enables transmission of radio or television channels from the broadcaster into broadcast networks. These networks consist of terrestrial transmitters for analogue or digital radio and television, cable networks or satellites.

According to an embodiment herein, the Set-Top-Box 107 receives modulated output of the centrally controlled playout system and transparently transmits radio or television channels from the broadcaster to the television 108.

According to an embodiment herein, the advertisement insertion module 109*l* . . . 109*n* automatically inserts television commercials at specific time slots within one or more television programs.

The centrally controlled playout system dynamically adjusts the pre-scheduled one or more time slots in the television programs based on the received television commercials. The centrally controlled playout system dynamically shrinks a specific time slot in the television programs to adjust the television commercials to be inserted in that particular time slot, if the play time of the television commercial is less than the actual scheduled time slot in the television programs. For example, if a time slot in the television program or inserting television commercials is predefined for '5 minutes', and if the play time of the specific television commercial is '3 minutes' then the centrally controlled playout system dynamically shrinks the specific time slot in the television program to '3 minutes' and then the rest of the programs are dynamically re-adjusted.

According to an embodiment herein, the centrally controlled playout system dynamically fills the promotional advertisements or filler advertisements at a specific time slot in the television programs to adjust the television commercials to be inserted in that particular time slot, if the play time of the television commercial is less than the actual scheduled time slot in the television programs. For example, if a time slot in the television program for inserting television commercials is predefined for '5 minutes', and if the play time of the specific television commercial is '3 minutes' then the centrally controlled playout system dynamically inserts '2 minutes' of promotional advertisements or filler advertisements at the '5 minutes' time slot in the television program.

According to an embodiment herein, the centrally controlled playout system reports the proof of television commercial played within the said time-slot for accountability. The centrally controlled playout system creates a proof of play archive such as a video achieve comprising an actual television commercial played at the scheduled time along with the date and time stamp.

According to an embodiment herein, the system further comprises a web based monitoring application which then accesses the reports and video archives from the centrally controlled playout system and displays them to advertisers who are authorized to see these reports through a unique password or access mechanism provided to them. This provides a proof of play mechanism for accountability purpose.

According to an embodiment of the embodiments herein, the RF modulator 106 receives radio or television channels from the centrally controlled playout system, combines the received radio or television channels with plurality of radio or television channels and inserts into the common cable. The plurality of radio or television channels are transmitted though a single cable with different frequencies to the set-top-box 107.

According to an embodiment herein, the modulated radio or television channels receiving at the set-top-box 107 are de-modulated either by the set-top-box 107 or by the television 108.

Figure 2:
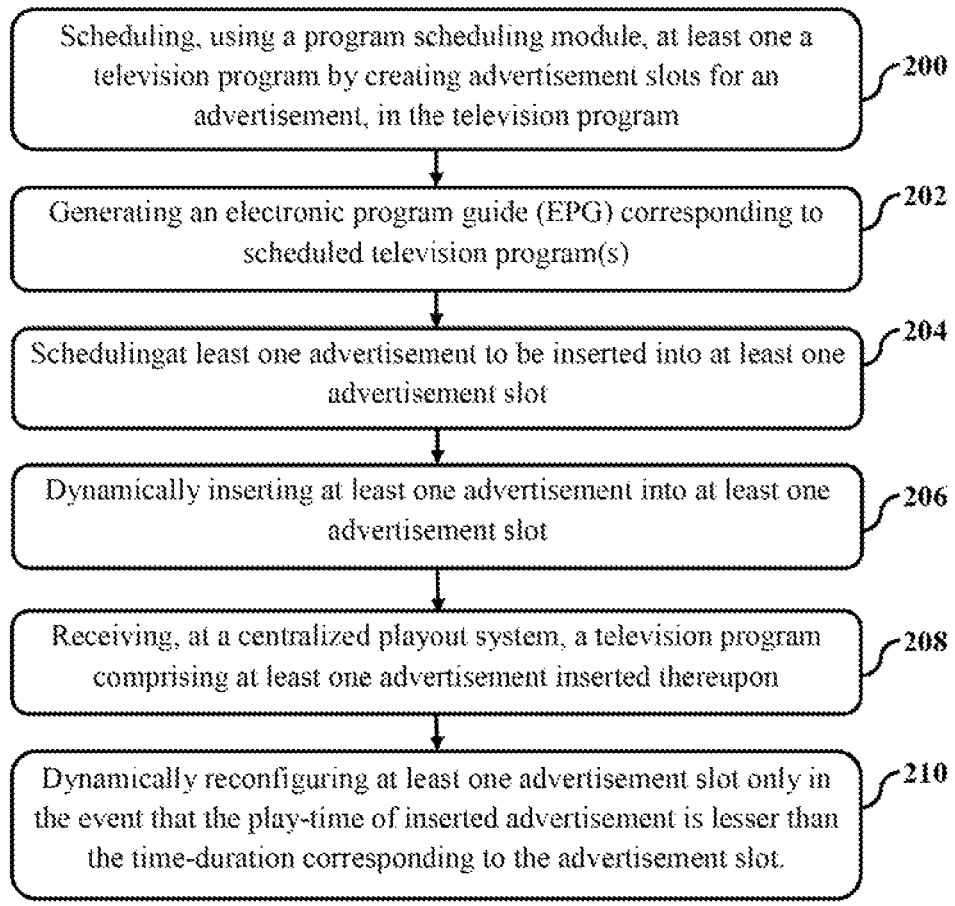
FIG. 2 illustrates a flowchart indicating a method for dynamically reconfiguring a plurality of scheduled advertisement slots, according to an embodiment herein.

FIG. 2 illustrates a flowchart indicating the steps involved in the method for dynamically reconfiguring a plurality of scheduled advertisement slots. The method, in accordance with the embodiments herein, comprises the following steps: scheduling, using a program scheduling module, at least one television program by creating pre-determined, time-specific advertisement slots for at least one advertisement, in the television program (200); generating, using the program scheduling module, an electronic program guide (EPG) corresponding to scheduled television program(s) (202); scheduling, using an advertisement module, at least one advertisement to be inserted into at least one pre-determined, time-specific advertisement slot (204); dynamically inserting, at least one advertisement into at least one of the pre-determined, time specific advertisement slots, using an advertisement insertion module (206); receiving, at a centrally controlled playout system, a television program comprising at least one advertisement inserted thereupon (208); dynamically reconfiguring at least one advertisement slot at the centrally controlled playout system, only in the event that the play-time of inserted advertisement is lesser than the time-duration corresponding to the advertisement slot (210).

In accordance with the embodiments herein, the step of generating an electronic program guide further includes the step of storing the EPG created by the program scheduling module, in a media grid.

In accordance with the embodiments herein, the method further includes the step of storing in the media grid the information corresponding to the television programs and advertisements.

In accordance with the embodiments herein, the method further includes the step of receiving television programs from the centrally controlled playout system using an RF modulator, and broadcasting the television programs at different pre-determined frequencies.

In accordance with the embodiments herein, the method further includes the step of generating a proof of play report using the centrally controlled playout system, wherein the proof of play report comprising information corresponding to the broadcast of the advertisements.

In accordance with the embodiments herein, the method further includes the step of analyzing the proof of play report, and displaying the proof of play report to owners of the advertisements.

The embodiments herein envisages a non-transitory computer readable storage medium having computer readable instructions stored thereupon, the computer readable instructions when executed by a processor, cause a computer enabled device to: schedule at least one television program by creating pre-determined, time-specific advertisement slots for at least one advertisement, in the television program; generate an electronic, program guide (EPG) corresponding to scheduled television program(s); schedule at least one advertisement to be inserted into at least one pre-determined, time-specific advertisement slot; dynamically insert at least one advertisement into at least one of the pre-determined, time specific slots; receive a television program comprising at least one advertisement inserted thereupon; and dynamically reconfigure at least one advertisement slot of the received television program, only in the event that the play-time of inserted advertisement is lesser than the time-duration corresponding to the advertisement slot.

Although the embodiments herein are described with various specific embodiments, it will be obvious for a person skilled in the art to practice the embodiments herein the modifications.

The foregoing description of the specific embodiments herein will so fully reveal the general nature of the embodiments herein that others can, by applying current knowledge, readily modify and/or adapt for various applications such specific embodiments herein without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fail there between.

What is claimed is:

1. A computer implemented system for dynamically reconfiguring a plurality of scheduled advertisement slots, said system comprising:
    a program scheduling module configured to schedule at least one television program by creating pre-determined, time-specific advertisement slots for at least one advertisement, in said television program, said program scheduling module further configured to generate an electronic program guide (EPG) corresponding to scheduled television program(s);
    an advertisement scheduling module configured to schedule at least one advertisement to be inserted into at least one pre-determined, time-specific advertisement slot created by said program scheduling module;
    an advertisement insertion module configured to dynamically insert at least one advertisement into at least one of said pre-determined, time specific slots;
    a centrally controlled playout system cooperating with the advertisement scheduling module to receive a television program comprising at least one advertisement inserted thereupon, said centralized playout system configured to dynamically reconfigure at least one advertisement slot of said television program only in the event that the play-time of inserted advertisement is lesser than the time-duration corresponding to the advertisement slot.

2. The system as claimed in claim 1, wherein said system comprises a media grid cooperating with said program scheduling module and said advertisement scheduling module, said media grid configured to store the EPG created by the program scheduling module, said media grid further configured to store the information corresponding to the television programs and advertisements.

3. The system as claimed in claim 1, herein said system further comprises a radio frequency (RF) modulator cooperating with said central playout system, said RF modulator configured to receive television programs from said central playout system, and broadcast said television programs at different pre-determined frequencies.

4. The system as claimed in claim 1, wherein said centrally controlled playout system is further configured to generate a proof of play report, said proof of play report comprising information corresponding to broadcast of each of the advertisements.

5. The system as claimed in claim 4, wherein said system further includes a monitor configured to analyze said proof of play report, and display said proof of play report to owners of said advertisements.

6. A computer implemented method for dynamically reconfiguring a plurality of scheduled advertisement slots, said method comprising the following computer implemented steps:
    scheduling, using a program scheduling module, at least one television program by creating pre-determined, time-specific advertisement slots for at least one advertisement, in said television program;
    generating, using, the program scheduling module, an electronic program guide (EPG) corresponding to scheduled television programs);
    scheduling, using an advertisement module, at least one advertisement to be inserted into at least one pre-determined, time-specific advertisement slot;
    dynamically inserting at least one advertisement into at least one of said pre-determined, time specific slots, using an advertisement insertion module;
    receiving, at a centrally controlled playout system, a television program comprising at least one advertisement inserted thereupon;
    dynamically reconfiguring at least one advertisement slot at the centralized playout system, only in the event that the play-time of inserted advertisement is lesser than the time-duration corresponding to the advertisement slot.

7. The method as claimed in claim 6, wherein the step of generating an electronic program guide further includes the step of storing the EPG created by the program scheduling module, in a media grid.

8. The method as claimed in claim 7, wherein the method further includes the step of storing in the media grid the information corresponding to the television programs and advertisements.

9. The method as claimed in claim 6, wherein the method further includes the step of receiving television programs from said central playout system using an RF modulator, and broadcasting said television programs at different pre-determined frequencies.

10. The method as claimed in claim 6, wherein the method further includes the step of generating a proof of play report using said centrally controlled playout system, wherein said proof of play report, comprising information corresponding to the broadcast of the advertisements.

11. The method as claimed in claim 10, wherein the method further includes the step of analyzing said proof of play report, and displaying said proof of play report to owners of said advertisements.

12. A non-transitory computer readable storage medium having computer readable instructions stored thereupon, said computer readable instructions when executed by a processor, cause a computer enabled device to:
- schedule at least one television program by creating pre-determined, time-specific advertisement slots for at least one advertisement, in said television program;
- generate an electronic program guide (EPG) corresponding to scheduled television program(s);
- schedule at least one advertisement to be inserted into at least one pre-determined, time-specific advertisement slot;
- dynamically insert at least one advertisement into at least one of said pre-determined, time specific slots;
- receive a television program comprising at least one advertisement inserted thereupon;
- dynamically reconfigure at least one advertisement slot of the received television program, only in the event that the play-time of inserted advertisement is lesser than the time-duration corresponding to the advertisement slot.

* * * * *